(No Model.)
F. G. HUBBARD.
COOKING VESSEL.
No. 540,491. Patented June 4, 1895.
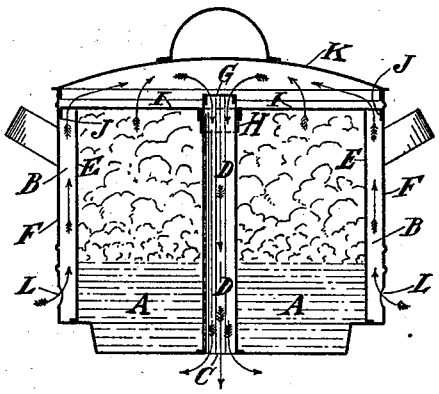
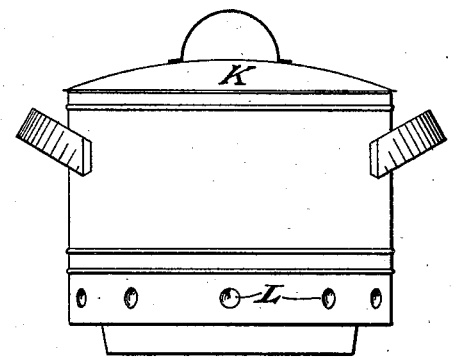
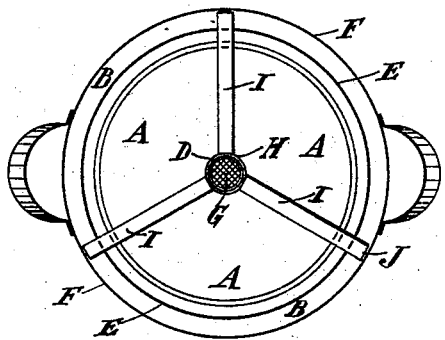
Witnesses:
Clara L. Roesch
Fred G. Hubbard
Inventor:
Fred G. Hubbard
By Erwin Wheeler & Wheeler
Attorneys.

UNITED STATES PATENT OFFICE.

FRED G. HUBBARD, OF MILWAUKEE, WISCONSIN.

COOKING-VESSEL.

SPECIFICATION forming part of Letters Patent No. 540,491, dated June 4, 1895.

Application filed May 11, 1894. Serial No. 510,881. (No model.)

*To all whom it may concern:*

Be it known that I, FRED G. HUBBARD, a citizen of the United States, residing at Milwaukee, in the county of Milwaukee and State of Wisconsin, have invented new and useful Improvements in Cooking-Vessels, of which the following is a specification.

My invention relates to improvements in that class of cooking vessels having downward flues for conveying odors produced by the process of cooking into the fire.

The object of my invention is to provide means whereby the odors which escape from the food in the process of cooking can be carried into the fire through the center of the vessel instead of being permitted to escape into the room.

In the following description, reference is had to the accompanying drawings, in which—

Figure I is a vertical section of my invention. Fig. II is a top view of the same. Fig. III is an elevation showing the exterior draft-opening.

Like parts are identified throughout by means of the same reference-letters.

A circular cooking vessel A is provided with a surrounding air space or passage B, which extends nearly to the base of the vessel. A central opening C in the bottom of the vessel is provided with a raised tube D which extends upward centrally to a point a little higher than the sides E of the vessel, or to about the height of the exterior wall F of the air passage B. The top of this central tube D is provided with a screen G to prevent any of the articles of food being thrown by violent boiling into the tube. For the purpose of bracing the top of the tube, I have provided a detachable ring H adapted to be placed over the top of the tube D. Horizontal braces I rigidly attached to the ring H extend outward therefrom to rest upon the top of the vessel sides E, with their ends provided with downwardly projecting flanges J abutting the exterior wall F of the air passage. This ring with the braces can be readily removed for cleaning the vessel, and, if desired, the screen G may be attached to the ring so as to be removed with it. An arched cover K is closely fitted to the outer wall F.

Air is admitted to the vessel through openings L in the exterior wall F near the bottom of the space or passage B and passes thence upward and over the sides E of the vessel, and down through the tube D into the fire. The action of the draft in stoves materially assists this movement of the air, creating a suction which draws all offensive odors into the fire. The openings L, being above the bottom of the passage B and the top of the tube D being above the sides E, any liquid that is thrown over in violent boiling, will be caught in the bottom of the passage B, and can be seen through the openings L, thus giving warning to the cook in time to remove the vessel and prevent spilling.

Having thus described my invention, what I claim as new, and desire to secure by Letters Patent, is—

The combination, with the ordinary parts of a cooking vessel, having a central opening in the bottom of the vessel an interior open tube attached to the sides of said opening and rising to a point near the top of the vessel, a screen covering the top of said tube, a ring adapted to slip over the top of said tube, provided with horizontal braces for supporting the upper end of said tube, and a close fitting cover for said vessel arched in such a manner as to leave a space between it and the tube, substantially as described.

In testimony whereof I affix my signature in the presence of two witnesses.

FRED G. HUBBARD.

Witnesses:
LEVERETT C. WHEELER,
CLARA L. ROESCH.